US012046406B2

(12) United States Patent
Kwon et al.

(10) Patent No.: US 12,046,406 B2
(45) Date of Patent: Jul. 23, 2024

(54) PLANAR TRANSFORMER INCLUDING Y-CAPACITOR

(71) Applicant: SOLUM CO., LTD., Yongin-si (KR)

(72) Inventors: Changyong Kwon, Suwon-si (KR); Junkyu Lee, Yongin-si (KR); Heung Gyoon Choi, Suwon-si (KR); Dongkyun Ryu, Seoul (KR)

(73) Assignee: SOLUM CO., LTD., Yongin-si (KR)

( * ) Notice: Subject to any disclaimer, the term of this patent is extended or adjusted under 35 U.S.C. 154(b) by 758 days.

(21) Appl. No.: 17/269,499

(22) PCT Filed: Aug. 23, 2019

(86) PCT No.: PCT/KR2019/010805
§ 371 (c)(1),
(2) Date: Feb. 18, 2021

(87) PCT Pub. No.: WO2020/040618
PCT Pub. Date: Feb. 27, 2020

(65) Prior Publication Data

US 2021/0327638 A1 Oct. 21, 2021

(30) Foreign Application Priority Data

Aug. 24, 2018 (KR) ........................ 10-2018-0099389

(51) Int. Cl.
*H01F 27/24* (2006.01)
*H01F 27/28* (2006.01)
(Continued)

(52) U.S. Cl.
CPC ......... *H01F 27/2804* (2013.01); *H01F 27/24* (2013.01); *H01F 27/34* (2013.01);
(Continued)

(58) Field of Classification Search
CPC ...... H01F 27/2804; H01F 27/24; H01F 27/34; H01F 27/363; H01F 2027/2809;
(Continued)

(56) References Cited

U.S. PATENT DOCUMENTS

| | | | |
|---|---|---|---|
| 6,420,953 | B1 | 7/2002 | Dadafshar |
| 10,388,449 | B2 | 8/2019 | Park et al. |

(Continued)

FOREIGN PATENT DOCUMENTS

| | | | |
|---|---|---|---|
| CA | 2046278 | A1 * | 8/1998 |
| KR | 100779238 | B1 | 11/2007 |

(Continued)

OTHER PUBLICATIONS

Decision to Grant for KR Patent Application No. 10-2018-0099389 filed on Aug. 24, 2018, on behalf of Solum Co., Ltd. Issuance date: Jun. 2, 2020. KR original and Partial English Translation. 6 Pages.

(Continued)

*Primary Examiner* — Tuyen T Nguyen
(74) *Attorney, Agent, or Firm* — Ladas & Parry, LLP

(57) ABSTRACT

A planar transformer is disclosed. The disclosed planar transformer includes: a magnetic core; a first coil unit formed in a conductor pattern in a plurality of layers stacked in the magnetic core; a second coil unit formed in a conductor pattern in the plurality of layers stacked in the magnetic core; an electromagnetic interference (EMI) reduction unit disposed on the output end of the second coil unit; and a base for accommodating the magnetic core and the coil units.

8 Claims, 8 Drawing Sheets

(51) Int. Cl.
*H01F 27/34* (2006.01)
*H01F 27/36* (2006.01)

(52) U.S. Cl.
CPC ... *H01F 27/363* (2020.08); *H01F 2027/2809* (2013.01); *H01F 2027/2819* (2013.01)

(58) Field of Classification Search
CPC ............ H01F 2027/2819; H01F 27/40; H01F 27/345; H01F 27/02; H01F 27/266; H01F 27/29; H01F 2017/002
See application file for complete search history.

(56) References Cited

U.S. PATENT DOCUMENTS

| | | | |
|---|---|---|---|
| 2011/0241816 | A1 | 10/2011 | Park et al. |
| 2012/0038448 | A1 | 2/2012 | Kim et al. |
| 2012/0146741 | A1 | 6/2012 | Yen et al. |

FOREIGN PATENT DOCUMENTS

| | | | |
|---|---|---|---|
| KR | 20090034424 | A | 4/2009 |
| KR | 20110111778 | A | 10/2011 |
| KR | 20120025441 | A | 3/2012 |
| KR | 101452827 | B1 * | 10/2014 |
| KR | 101590132 | B1 | 2/2016 |
| KR | 20160126350 | A | 11/2016 |
| KR | 101764146 | B1 | 8/2017 |

OTHER PUBLICATIONS

International Search Report for International PCT Application No. PCT/KR2019/010805filed on Aug. 23, 2019 on behalf of Solum Co., Ltd. Mail Date: Dec. 13, 2019. Korean Original + English Trans. 5 Pages.

Korean Notice of Preliminary Rejection for KR Patent Application No. 10-2018-0099389 filed on Aug. 24, 2018, on behalf of Solum Co., Ltd. Issuance date: Dec. 12, 2019. KR original and Partial English Translation. 8 Pages.

Written Opinion for International PCT Application No. PCT/KR2019/010805 filed on Aug. 23, 2019, on behalf of Solumco., Ltd. Mail Date: Dec. 13, 2019. Korean Original + English Trans.9 pages.

* cited by examiner

FIG. 7

| | Load | OUTPUT VOLTAGE(V) | INPUT POWER(W) | EFFICIENCY(%) | AVERAGE EFFICIENCY(%) |
|---|---|---|---|---|---|
| 115V | 0.42 | 9.052 | 4.403 | 86.3466 | 87.2124 |
| | 0.84 | 9.145 | 8.768 | 87.6118 | |
| | 1.25 | 9.239 | 13.172 | 87.6765 | |
| | 1.67 | 9.333 | 17.871 | 87.2145 | |
| 230V | 0.42 | 9.052 | 4.517 | 84.1674 | 86.7188 |
| | 0.84 | 9.146 | 8.878 | 86.5357 | |
| | 1.25 | 9.239 | 13.13 | 87.9570 | |
| | 1.67 | 9.336 | 17.674 | 88.2150 | |

FIG. 8

| | Load | OUTPUT VOLTAGE(V) | INPUT POWER(W) | EFFICIENCY(%) | AVERAGE EFFICIENCY(%) |
|---|---|---|---|---|---|
| 115V | 0.42 | 9.038 | 4.36 | 87.06 | 87.13 |
| | 0.84 | 9.102 | 8.706 | 87.82 | |
| | 1.26 | 9.165 | 13.227 | 87.31 | |
| | 1.67 | 9.228 | 17.853 | 86.32 | |
| 230V | 0.42 | 9.037 | 4.36 | 87.05 | 86.59 |
| | 0.84 | 9.107 | 8.952 | 85.45 | |
| | 1.26 | 9.166 | 13.301 | 86.83 | |
| | 1.67 | 9.232 | 17.715 | 87.05 | |

PLANAR TRANSFORMER INCLUDING Y-CAPACITOR

CROSS REFERENCE TO RELATED APPLICATIONS

The present application is the U.S. national stage of International Patent Application PCT/KR2019/010805 filed internationally on Aug. 23, 2019, which, in turn, claims priority to Korean Patent Application No. 10-2018-0099389 filed on Aug. 24, 2018.

TECHNICAL FIELD

The disclosure relates to a transformer, and more particularly to a planar transformer capable of omitting a Y-capacitor separately used in a power supply device by implementing a Y-capacitor in a stacked pattern in a multi-layer printed circuit board.

BACKGROUND ART

In general, a production process of a planar transformer is simpler than a winding type transformer, thereby reducing the unit cost of production and reducing human error to ensure stable mass production quality. Such a planar transformer has excellent skin and proximity effect and accordingly this is suitable for current trend with an increase in switching frequency.

Referring to FIG. 1, a planar transformer 20 may be mounted and used on a flyback type power supply device (e.g., adaptor) 10 formed of simple parts and configuration. However, the power supply device 10 has great conducting and radiation noise, and accordingly, it is necessary to use a noise coupling capacitor between primary and secondary coils to satisfy EMI standards.

Meanwhile, the performance of the transformer 20 may be determined with conducting noise as an index at 30 MHz or lower, and may be determined with radiation noise as an index at 30 MHz or higher. The conducting noise may be removed through a line filter provided at a power source input end and the radiation noise may be removed through a by-pass capacitor expressed as a Y-capacitor 30 mounted on an AC ground portion and a DC ground portion as illustrated in FIG. 1. The Y-capacitor 30 may be formed of a ceramic material having excellent high frequency properties and play a role of a noise coupling capacitor between primary and secondary coils.

Meanwhile, it is necessary to mount the Y-capacitor 30 which is a physical element on the power supply device, but this may make the cost reduction of the product difficult and the size of the power supply device 10 may not be maintained compact.

DISCLOSURE

Technical Problem

An object of the disclosure is to provide a planar transformer capable of omitting a Y-capacitor separately used in a power supply device by implementing a Y-capacitor in a stacked pattern in a multi-layer printed circuit board.

Technical Solution

In order to achieve the above object, the disclosure provides a planar transformer including: a magnetic core; a first coil unit formed in a conductor pattern in a plurality of layers stacked in the magnetic core; a second coil unit formed in a conductor pattern in the plurality of layers stacked in the magnetic core; an electromagnetic interference (EMI) reduction unit disposed on an output end of the second coil unit; and a base for accommodating the magnetic core and the coil units.

The EMI reduction unit may include a first part and a second part formed to extend from both end portions of the conductor pattern of the second coil unit.

The conductor pattern of the second coil unit may include a first pattern formed in a first spiral direction and a second pattern formed in a second spiral direction, that is the same as the first spiral direction, respectively on stacked layers different from each other, and the first and second patterns may be electrically connected to each other via at least one via.

The first part may surround an output terminal combined with the second part at an interval, and the second part may surround another output terminal combined with the first part at an interval.

The first part may surround at least a part of the output terminal combined with the second part, and the second part may surround at least a part of the other output terminal combined with the first part.

The first part may be disposed on an upper side of the second pattern at an interval, and the second part may be disposed on a lower side of the first pattern at an interval.

Effect of Invention

As described above, according to an embodiment of the disclosure, the Y-capacitor mounted on the power supply device may be omitted and the EMI reduction unit for playing a role of the Y-capacitor element may be embedded in the planar transformer, thereby reducing cost and volume of the power supply device.

In addition, in the disclosure, the output end of the planar transformer may be an output end of the power supply device, and accordingly, the radiation noise may be removed by applying a function of the Y-capacitor to the output end of the planar transformer configured with the stacked pattern of the printed circuit board.

DESCRIPTION OF DRAWINGS

FIG. 7 illustrates an experiment result showing efficiency of a planar transformer of the related art applied to a power supply device including a physical Y-capacitor element for EMI reduction.

FIG. 8 illustrates an experiment result showing efficiency of a planar transformer according to an embodiment equipped with an EMI reduction unit.

DETAILED DESCRIPTION OF EXEMPLARY EMBODIMENTS

Figure 1:
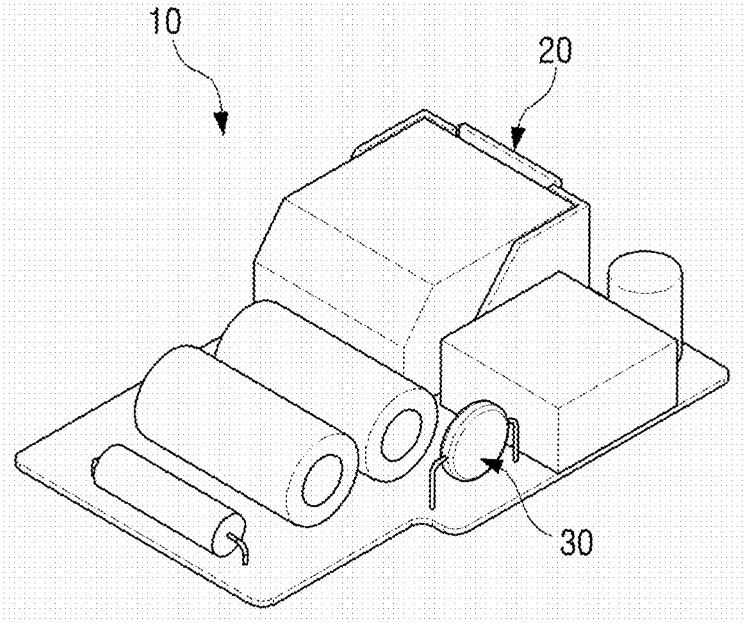
FIG. 1 is a perspective view schematically illustrating a power supply device (adaptor) on which a planar transformer of the related art is mounted.

Hereinafter, various embodiments will be described in more detail with reference to the accompanying drawings. The embodiments described in this specification may be variously modified. A specific embodiment may be illustrated in the drawings and may be specifically described in the description. However, the specific embodiment illustrated in the accompanying drawings may be merely for easy understanding of the various embodiments. Therefore, it should be understood that the technical spirit is not limited to the specific embodiment illustrated in the accompanying drawings and equivalents or alternatives included in the disclosed spirit and technical scope are included.

The terms including ordinals such as "first" or "second" may be used for describing various elements, but the elements are not limited to the above terms. The above terms are used only for distinguishing one element from another.

It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof. The expression that a certain component is "connected" or "coupled" to another component includes a case where the components are directly connected or coupled to each other, but also a case where the components are connected to each other with another component interposed therebetween. In contrast, if it is described that a certain element is "directly connected" or "directly coupled" to another element, it should be understood that any other elements are present therebetween.

In addition, in describing the disclosure, a detailed description of the related art or configuration may be omitted when it is determined that the detailed description thereof may unnecessarily obscure a gist of the disclosure.

Figure 2:
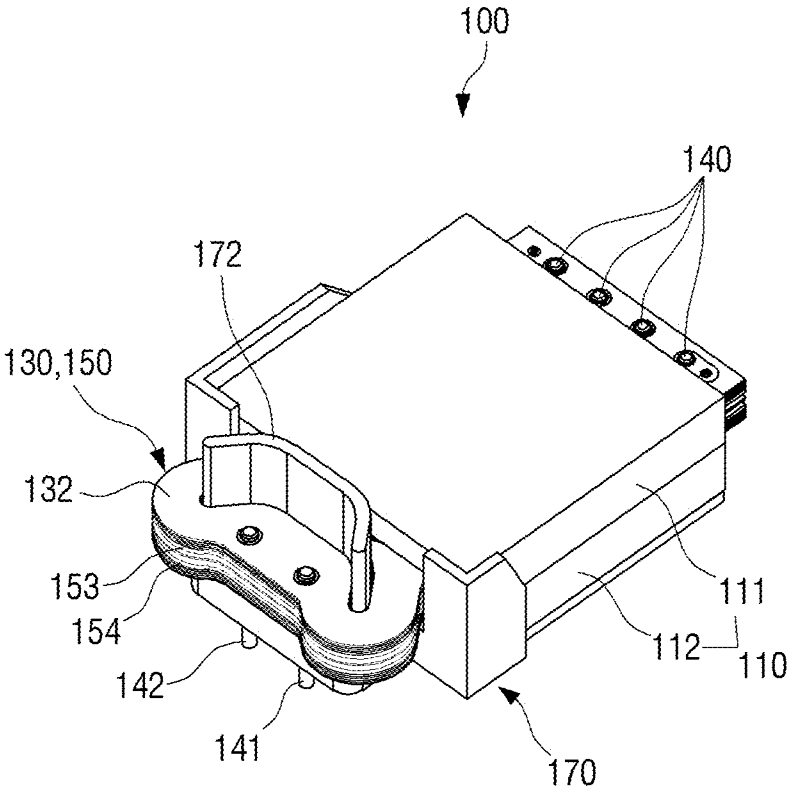
FIG. 2 is an assembly perspective view illustrating a planar transformer according to an embodiment.
Figure 3:
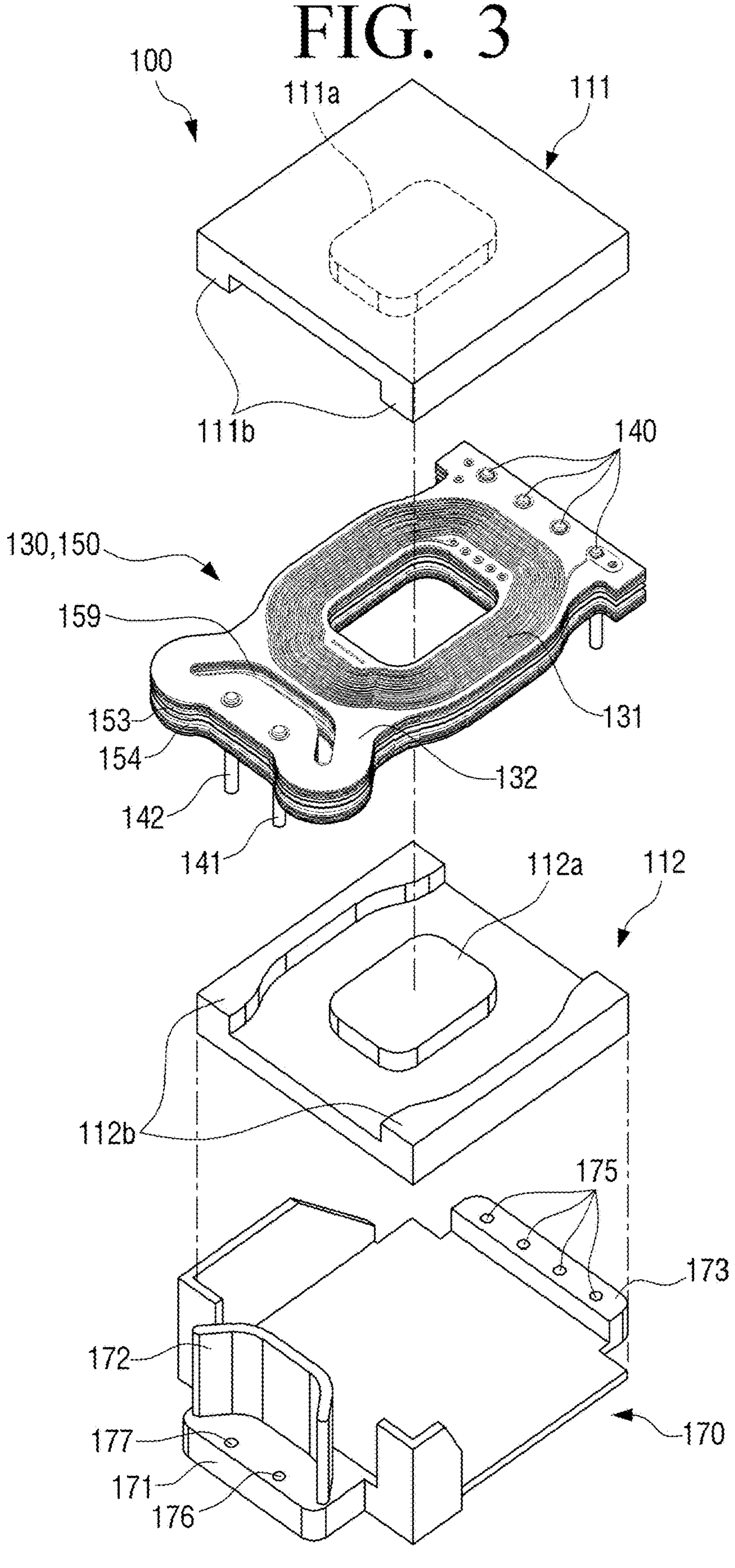
FIG. 3 is an exploded perspective view illustrating a planar transformer according to an embodiment.

FIG. 2 is an assembly perspective view illustrating a planar transformer according to an embodiment and FIG. 3 is an exploded perspective view illustrating a planar transformer according to an embodiment.

Referring to FIGS. 2 and 3, a transformer 100 according to an embodiment of the disclosure may be a planar transformer for high power and high current that is mounted on a power supply device. The transformer 100 may include a magnetic core 110, a first coil unit 130, a second coil unit 150, and a base 170.

The magnetic core 110 may be disposed while the first and second coil units 130 and 150 are stacked therein, thereby forming a magnetic path for electromagnetic coupling.

The magnetic core 110 may include an upper core 111 and a lower core 112 disposed to face each other symmetrically. The upper core 111 may include a middle leg 111*a* and outer legs 111*b* and a space may be formed between the middle leg 111*a* and the outer leg 111*b*. The lower core 112 may include a middle leg 112*a* and outer legs 112*b*. In the spaces provided in the upper core 111 and the lower core 112 respectively described above, the first and second coil units 130 and 150 may be disposed.

The magnetic core 110 illustrated in the embodiment is illustrated as an E type core having an E-shaped cross section but there is no particular limitation thereto. For example, the magnetic core 110 may be formed as an E-I type magnetic core, an I-I type magnetic core, and the like.

The magnetic core 110 may be formed of a Mn—Zn-based ferrite having high permeability, low loss, high saturated magnetic flux density, stability, and low production cost compared to other materials. However, in the embodiment of the disclosure, the shape or the material of the magnetic core 110 are not limited.

The first coil unit 130 and the second coil unit 150 may correspond to a primary coil and a secondary coil of a typical transformer, respectively. When a power source is applied to the first coil unit 130 connected to an external power supply via a plurality of input terminals 140, the power (power changed from commercial power) induced by the second coil unit 150 may be supplied to a circuit of a power supply device (not illustrated) connected to the transformer 100 via the plurality of input terminals 140.

Figure 4:
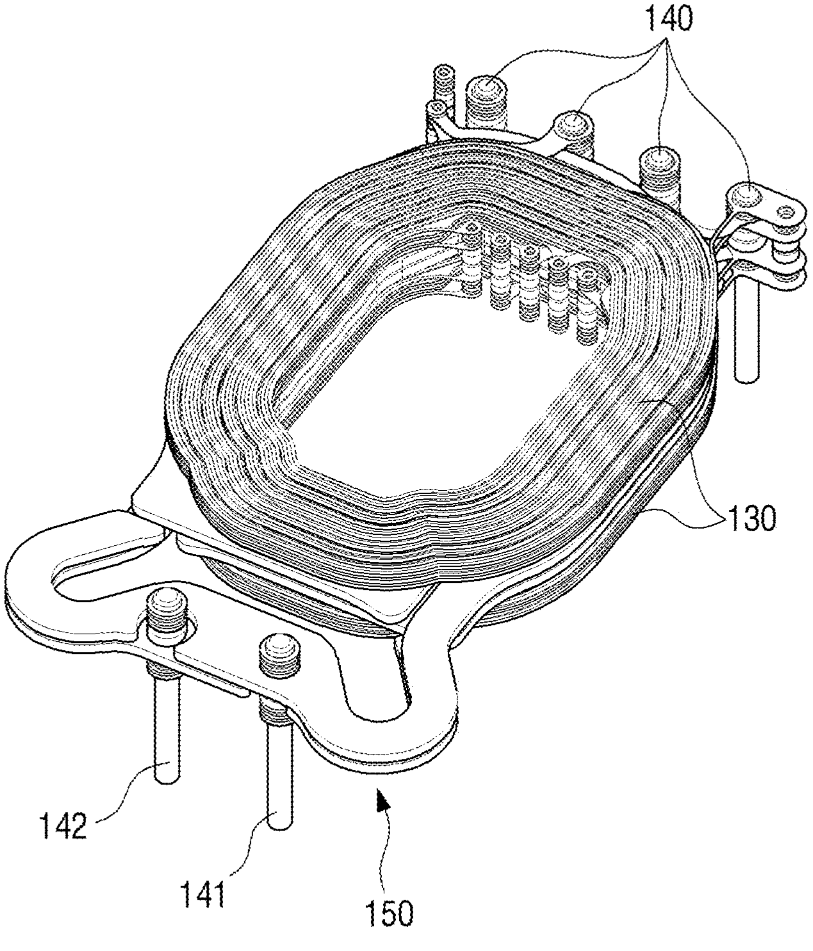
FIG. 4 is a perspective view illustrating a first coil unit and a second coil unit in a state where a plurality of stacked layers are removed.

FIG. 4 is a perspective view illustrating a first coil unit and a second coil unit in a state where a plurality of stacked layers are removed.

Referring to FIG. 4, the first coil unit 130 may include a conductor pattern 131 forming an inductor pattern having a predetermined number of windings and a plurality of layers 132 on which the conductor patterns 131 are formed, respectively. The first coil unit 130 may be divided into two groups and disposed so as to be stacked on both side surfaces of the second coil unit 150, respectively.

However, the first coil unit 130 may not be limitedly disposed as described above and may also be disposed as one group on any one side surface from among the both side surfaces of the second coil unit 150.

The first coil unit 130 may be formed with one coil pattern and induce a current to the second coil unit 150. In addition, the first coil unit 130 may include a primary coil pattern and a Vcc coil pattern separated from each other. The primary coil pattern may induce a current to the second coil unit 150 and the Vcc coil pattern may obtain the induced electromotive force from the second coil unit 150, to which the current is induced, and supply the power to components included in the transformer 100.

The plurality of input terminals 140 electrically connected to the first coil unit 130 may include a terminal Vcc connected to an IC power supply line, a ground terminal GND, and a terminal for power input.

Figure 5:
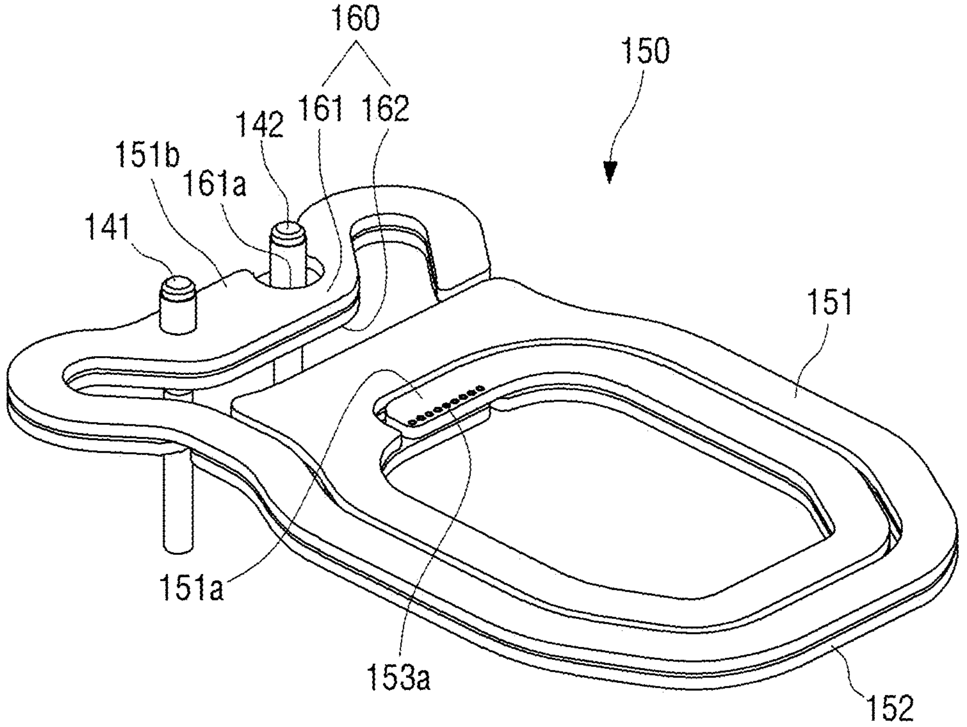
FIGS. 5 and 6 are perspective views of a second coil unit combined with a plurality of output terminals seen in different directions.
Figure 6:
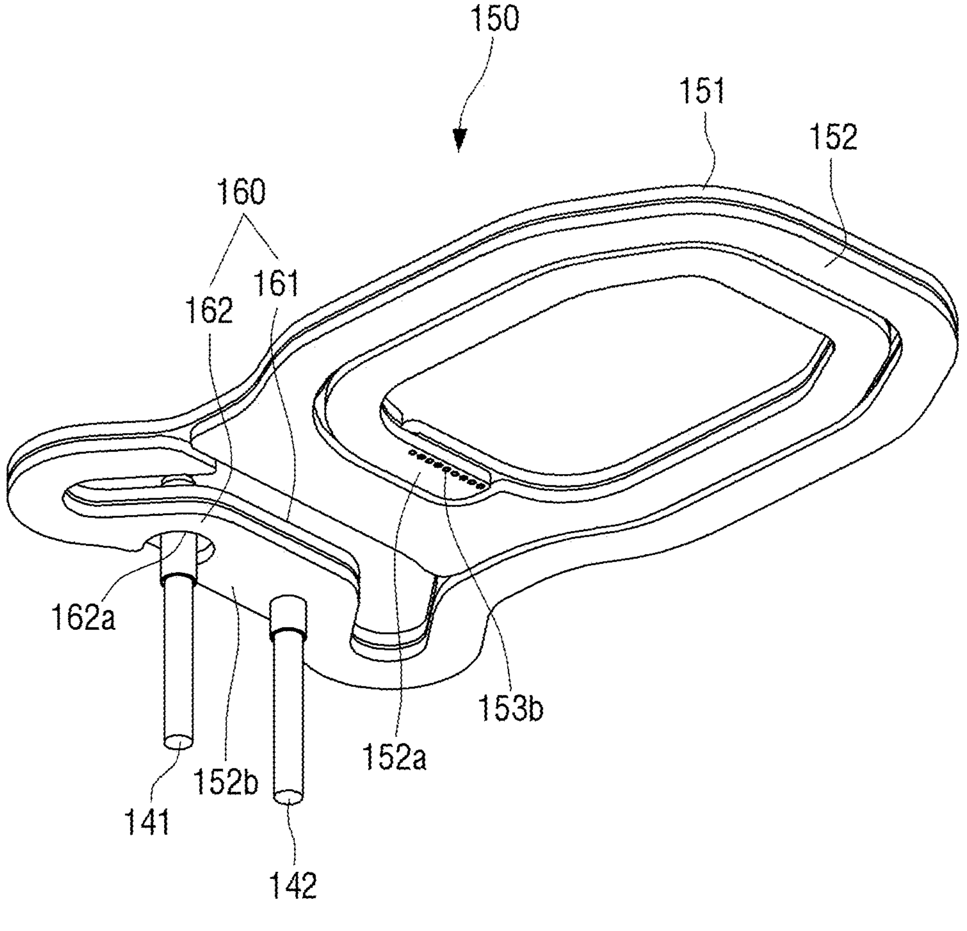

FIGS. 5 and 6 are perspective views of a second coil unit combined with output terminals seen in different directions.

Referring to FIGS. 5 and 6, the second coil unit 150 may be integrally formed with the first coil unit 130 to form one multi-layer printed circuit board.

The second coil unit 150 may include a conductor pattern forming an inductor pattern having a predetermined number of windings and a plurality of layers on which the conductor patterns are formed, respectively.

The conductor pattern of the second coil unit 150 may include a first pattern 151 formed on one surface of a layer 153 along a first spiral direction and a second pattern 152 formed on one surface of another layer 154 in a second spiral direction that is the same as the first spiral direction.

Regarding the first and second patterns 151 and 152, one end portions 151*a* and 152*a* positioned approximately in a center portion of the second coil unit 150 may be electrically connected to each other via a plurality of vias 153*a* and 153*b*. First and second output terminals 141 and 142 having a pin shape may penetrate to be combined with other end portions 151*b* and 152*b* of the first and second patterns 151 and 152 (that is, output end of the second coil unit 150), respectively.

An EMI reduction unit 160 may play a role of the Y-capacitor 30 of the related art (see FIG. 1) and may form a part of the first and second patterns 151 and 152. In other words, the EMI reduction unit 160 may be integrally formed with the second coil unit 150.

The EMI reduction unit 160 may include a first part 161 formed to extend from the other end portion 151*b* of the first pattern 151 and a second part 162 formed to extend from the other end portion 152*b* of the second pattern 152.

Referring to FIG. 5, the first part 161 may be disposed on the upper side of the second pattern 152 at a predetermined interval.

A first groove 161*a* may be formed on the first part 161 so that the second output terminal 142 combined with the other end portion 152*b* of the second pattern 152 penetrates through. A size of the first groove 161*a* may be formed to be larger than a diameter of the second output terminal 142, and accordingly, the second output terminal 142 may be surrounded by the first part 161 with a predetermined interval.

A shape of the second part 162 may be formed in the same manner as the shape of the first part 161 described above.

Referring to FIG. 6, the second part 162 may be disposed on the lower side of the first pattern 151 with a predetermined interval.

A second groove 162*a* may be formed on the second part 162 so that the first output terminal 141 combined with the other end portion 151*b* of the first pattern 151 penetrates through. A size of the second groove 162*a* may be formed to be larger than a diameter of the first output terminal 141, and accordingly, the first output terminal 141 may be surrounded by the second part 162 with a predetermined interval.

As described above, the first and second parts 161 and 162 may be integrally formed to extend from the first and second patterns 151 and 152, respectively and disposed at an interval, thereby playing a role of a noise coupling capacity instead of the Y-capacitor element of the related art.

In addition, in the planar transformer according to an embodiment of the disclosure, the volume of the capacitor may be increased by increasing the area of the first and second parts 161 and 162 forming the EMI reduction unit 160. In this case, the shape of the first and second parts 161 and 162 is not limited to the shape illustrated in FIGS. 5 and 6 and may have various shapes to increase the area thereof.

In addition, the embodiment of the disclosure is described by limiting the region of the EMI reduction unit 160 to the first and second parts 161 and 162, but there is no limitation thereto, and a region adjacent to the first and second parts, that is, a part of each of the first and second patterns 151 and 152 combined with the first and second output terminals 141 and 142 may also be defined as the EMI reduction unit.

As described above, in an embodiment of the disclosure, along with the trend of light and thin power supply devices and an increase of a switching frequency, the EMI reduction unit 160 playing a role of the Y-capacitor element may be embedded in the planar transformer 100 by omitting the Y-capacitor element of the related art. Therefore, in an embodiment of the disclosure, a size of a product may be maintained compact and the production cost may be reduced at the same time.

In addition, referring to FIGS. 7 and 8, the transformer 100 embedded with the EMI reduction unit 160 may have substantially the same efficiency compared to the related art including the Y-capacitor element.

FIG. 7 illustrates an experiment result showing efficiency of a planar transformer of the related art applied to a power supply device including a physical Y-capacitor element for EMI reduction and FIG. 8 illustrates an experiment result showing efficiency of a planar transformer according to an embodiment equipped with an EMI reduction unit.

FIGS. 7 and 8 illustrate results obtained by experiments under the same condition of 15 W (9 V, 1.67 A) using the 18 W planar transformer in the same manner in the related art and the disclosure.

Referring to FIG. 7, in the related art, in cases of loads of 0.42, 0.84, 1.25, and 1.67 under an input voltage of 115 V, efficiency is shown as 86.3466%, 87.6118%, 87.6765%, and 87.2145%, and average efficiency is shown as 87.2124%. Referring to FIG. 8, in the disclosure, in cases of loads of 0.42, 0.84, 1.26, and 1.67 under the same input voltage of 115 V which is the same as in the related art, efficiency is shown as 87.06%, 87.82%, 87.315%, and 87.32% and average efficiency is shown as 87.13%. As described above, the average efficiency in both of the related art and the disclosure is shown at the level of 87%, and this shows that there is no difference in the efficiency thereof.

In addition, as a result of the measurement at the input voltage of 230 V, in the related art as illustrated in FIG. 7, in cases of loads of 0.42, 0.84, 1.25, and 1.67, efficiency is shown as 84.1674%, 86.5357%, 87.9570%, and 88.2150% and average efficiency is shown as 86.7188%. Referring to FIG. 8, in the disclosure, in cases of loads of 0.42, 0.84, 1.26, and 1.67, efficiency is shown as 87.05%, 85.45%, 86.83%, and 87.03% and average efficiency is shown as 86.59%. As described above, the average efficiency in both of the related art and the disclosure is shown at the level of 86%, and this shows that there is no difference in the efficiency thereof, compared to the case where the input voltage is 115 V.

In addition, the planar transformer 100 according to an embodiment of the disclosure may ensure a margin of 10 dB or more with respect to EMI conducted emission (CE).

As described above, an embodiment of the disclosure may maintain the same level as in the related art in terms of performance.

Meanwhile, a base 170 may be formed to include a coil assembly in which the magnetic core 110 is combined with the first and second coil units 130 and 150 therein as in FIG. 1 and may form an entire body of the transformer 100.

Referring to FIG. 2, in the base 170, a plurality of first combination holes 176 and 177 to be combined with lower ends of the plurality of output terminals 141 and 142, respectively, may be formed on one end portion 171, and a plurality of second combination holes 175 to be combined with lower ends of the plurality of input terminals 140, respectively, may be formed on another end portion 173.

In addition, in the base 170, a partition wall 172 protruded to an upper side from the one end portion 171 may be formed.

When the first and second coil units 130 and 150 integrally formed in a stacked manner are combined with the base 170, the partition wall 172 may be inserted to a slit 159 formed on the second coil unit 150. The partition wall 172 inserted to the slit 159 may be interposed between the magnetic core 110 and the output end of the second coil unit 150 to separate the magnetic core 110 and the output end of the second coil unit 150 from each other. Therefore, an insulation distance and a creepage distance between the magnetic core 110 and the output pattern may be ensured.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

INDUSTRIAL APPLICABILITY

The disclosure relates to a planar transformer capable of omitting a Y-capacitor separately used in a power supply device by implementing a Y-capacitor in a stacked pattern in a multi-layer printed circuit board.

What is claimed is:

1. A planar transformer comprising:

a magnetic core;

a first coil unit coupled to the magnetic core and formed in a conductor pattern in a plurality of stacked layers;

a second coil unit coupled to the magnetic core and formed in a conductor pattern in the plurality of stacked layers;

an electromagnetic interference (EMI) reduction unit disposed on an output end of the second coil unit; and a base for accommodating the magnetic core and the coil units, wherein the EMI reduction unit comprises a first part and a second part formed to extend from end portions of the conductor pattern of the second coil unit.

2. The planar transformer according to claim 1, wherein the conductor pattern of the second coil unit comprises a first pattern formed in a first spiral direction and a second pattern formed in a second spiral direction, that is the same as the first spiral direction, respectively on stacked layers different from each other, and wherein the first and second patterns are electrically connected to each other via at least one via.

3. The planar transformer according to claim 1, wherein the first part surrounds an output terminal combined with the second part at an interval, and wherein the second part surrounds another output terminal combined with the first part at an interval.

4. The planar transformer according to claim 3, wherein the first part surrounds at least a part of the output terminal combined with the second part, and wherein the second part surrounds at least a part of the other output terminal combined with the first part.

5. The planar transformer according to claim 3, wherein the first part is disposed on an upper side of the second pattern at an interval, and wherein the second part is disposed on a lower side of the first pattern at an interval.

6. The planar transformer according to claim 2, wherein the first part surrounds an output terminal combined with the second part at an interval, and wherein the second part surrounds another output terminal combined with the first part at an interval.

7. The planar transformer according to claim 6, wherein the first part surrounds at least a part of the output terminal combined with the second part, and wherein the second part surrounds at least a part of the other output terminal combined with the first part.

8. The planar transformer according to claim 6, wherein the first part is disposed on an upper side of the second pattern at an interval, and wherein the second part is disposed on a lower side of the first pattern at an interval.

* * * * *